(No Model.)

C. P. ROBERTSON & J. R. HICKS.
VEHICLE HUB AND AXLE.

No. 325,769. Patented Sept. 8, 1885.

WITNESSES
Charles Weber.
Sam J. Platt.

C. P. Robertson
J. R. Hicks
INVENTORS
by J. C. Higdon
Attorney.

UNITED STATES PATENT OFFICE.

COMMODORE P. ROBERTSON AND JAMES R. HICKS, OF KANSAS CITY, MO.

VEHICLE HUB AND AXLE.

SPECIFICATION forming part of Letters Patent No. 325,769, dated September 8, 1885.

Application filed July 2, 1885. (No model.)

*To all whom it may concern:*

Be it known that we, COMMODORE P. ROBERTSON and JAMES R. HICKS, of Kansas City, Jackson county, Missouri, have invented a new and Improved Form of Vehicle-Hub and an Axle to be Used therewith, of which the following is a full, clear, and exact description, reference being had to the accompanying drawings, which form a part hereof.

This invention relates to hubs fitted with rotative spindles and to axles carrying stationary boxes within which the spindles are adapted to rotate; and it consists, substantially, of the devices and the novel arrangement of parts hereinafter specified.

The objects which we seek to accomplish by our invention may be outlined as follows, viz: to exclude dust and grit from the bearing parts, to provide convenient means for lubricating the bearing parts, to so construct each part that it may readily be renewed when worn, and, in short, to provide an improved hub and axle that may readily be applied to vehicles already in use.

Figure 1:
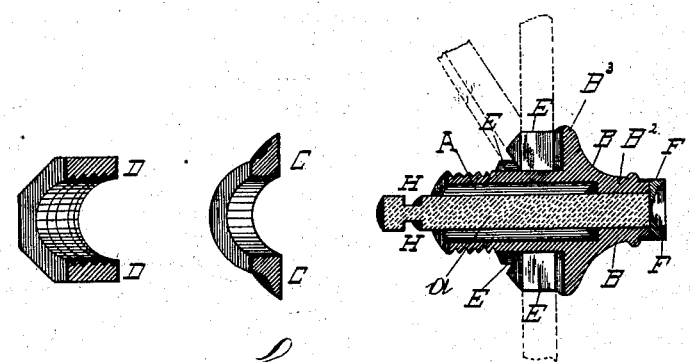
Figure 2:
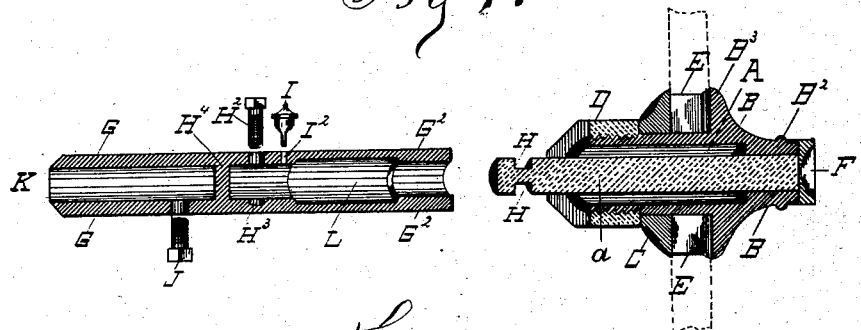
Figure 3:
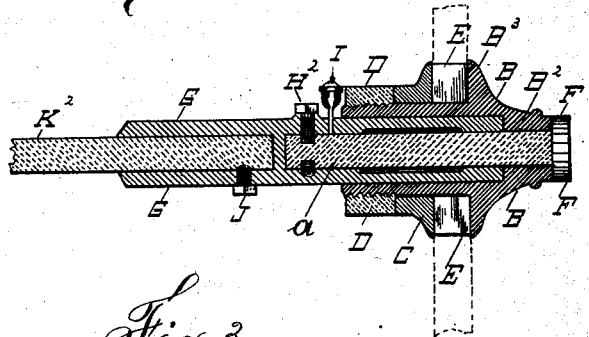

In the drawings, Figure 1 is a longitudinal section through the hub and spindle, the washer for holding the spokes in place, and the nut which confines it, the latter two parts being shown detached. Fig. 2 is a longitudinal section through the hub and spindle and through a stationary bearing piece or box, and Fig. 3 is a longitudinal section through the hub and spindle, the stationary box or bearing-piece, and a portion of an axle.

In carrying out the invention we construct the hub B with a cylindrical chamber, A, having a greater diameter than the spindle $a$, which is located therein. The chamber A extends directly through the hub; but it is contracted to a smaller diameter at the outer end of the hub, so as to form a seat, $B^2$, for the outer end of the spindle $a$. The said spindle should be securely fixed in place, either by being driven into the hub or by shrinking the hub thereon, as may be desired.

The hub is provided with spoke-sockets or mortises E, in which the ends of ordinary spokes may be inserted, and its inner end is screw-threaded upon the outside.

To hold the spokes rigidly in position a collar, C, is located upon the hub so that it will bear upon one side of the spokes and hold them securely in place.

An internally-threaded nut, D, is adapted to force said collar against the spokes and to bind the spokes firmly against the hub-flange $B^3$.

The bearing-piece G is provided with a socket, K, at one end, which is placed upon one end of an axle, $K^2$, and secured thereon by means of a set-screw, J, as shown. The opposite end of the bearing-piece G constitutes the box in which the spindle $a$ has its bearing, and the hub is adapted to operate upon this end of the bearing-piece, the spindle engaging the bore of the boxing, as shown more clearly in Fig. 3.

An internal annular recess, L, is formed in the spindle end $G^2$ of the bearing-piece. It will be noticed that the recess L encircles the spindle when the parts are in place, and we believe that such recess is well adapted to retain oil in the bearing, thus preventing any wastage of the lubricant.

An oil-cup, I, is located in a vertical position upon the bearing-piece G, and by means of a passage, $I^2$, oil may be fed from it to the spindle.

Near the inner end of the spindle $a$ an annular groove, H, is formed, and this, in connection with a pin or screw, $H^2$, which passes through a suitable hole, $H^3$, in the shell of the bearing-piece G and engages said groove upon one side of the spindle, constitutes the means which we employ to secure the hub upon the bearing-piece.

It will be observed that the outer end of the hub is entirely closed by the spindle, which passes therethrough, and such an arrangement does not make a bad finish. Still in some cases, where higher ornament is desired, a cap-piece, F, of brass may be placed upon the outer end of the hub.

The bearing-piece G may of course be fitted to either square or round axles, and in the drawings the letter $K^2$ should be so construed.

A hub constructed after the above manner and fitted with spokes may be very readily repaired. For instance, when a spoke is to be put in, the nut D is removed and the washer C will come off, exposing one side of the spoketenon. This can be easily driven out sidewise without disturbing tire or felly.

When the bearing piece or box G is to be renewed, the set-screw J should be loosened. This releases the bearing-piece from the axle $K^2$, after which by removing the bolt $H^2$ the bearing-piece may be removed from the hub and a new one may be put in place.

We prefer to cast a web, $H^4$, across the bore of the bearing-piece G, so as to confine the lubricant to the spindle-bearing and prevent its probable leakage past or around the axle $K^2$, as shown.

Having thus described our invention, what we claim is—

1. A removable or detachable bearing-piece having a socket formed in one end, whereby it is attached to the axle, and having a bearing for a rotatable spindle formed in the opposite extremity, substantially as specified.

2. The combination, with a non-rotatable axle, of a removable bearing-piece having a socket formed in one end for rigidly engaging the axle, and having a socket for containing a rotatable spindle at the opposite extremity, and a hub provided with a recess and carrying a spindle which engages the last-mentioned socket, substantially as described.

In testimony whereof we affix our signatures in presence of two witnesses.

COMMODORE P. ROBERTSON.
JAMES R. HICKS.

Witnesses:
 JOHN W. NORTON,
 HUGH MILLER.